US010239459B2

(12) United States Patent
Tsalenko et al.

(10) Patent No.: US 10,239,459 B2
(45) Date of Patent: Mar. 26, 2019

(54) DOOR FOR VEHICLE CONSOLE (71) Applicant: NYX, Inc., Livonia, MI (US)

(72) Inventors: Yuriy Tsalenko, West Bloomfield, MI (US); Regginald Edward Poindexter, Jr., Warren, MI (US)

(73) Assignee: NYX, INC., Livonia, MI (US)

( * ) Notice: Subject to any disclaimer, the term of this patent is extended or adjusted under 35 U.S.C. 154(b) by 951 days.

(21) Appl. No.: 14/689,370

(22) Filed: Apr. 17, 2015

(65) Prior Publication Data
US 2015/0337572 A1 Nov. 26, 2015

Related U.S. Application Data (60) Provisional application No. 62/001,733, filed on May 22, 2014.

(51) Int. Cl.
B60R 7/04 (2006.01)
E05B 85/22 (2014.01)
E05B 83/32 (2014.01)

(52) U.S. Cl.
CPC .............. B60R 7/04 (2013.01); E05B 83/32 (2013.01); E05B 85/22 (2013.01); Y10T 292/1014 (2015.04)

(58) Field of Classification Search
CPC . B60R 7/04; E05B 83/32; E05B 83/28; E05C 9/04; E05C 9/042; E05C 9/14; E05C 1/004; E05C 1/08; E05C 1/085; E05C 1/12; E05C 1/14; E05C 1/145; Y10T 292/0801; Y10T 292/0837; Y10T 292/0838; Y10T 292/0839; Y10T 292/084; Y10T 292/0844; Y10T 292/0845
USPC .............................................. 296/24.34, 37.8
See application file for complete search history.

(56) References Cited

U.S. PATENT DOCUMENTS

| | | | |
|---|---|---|---|
| 5,136,752 A | 8/1992 | Bening et al. | |
| 7,004,527 B2 | 2/2006 | Niwa et al. | |
| 7,125,063 B2 | 10/2006 | Kawamoto et al. | |
| 7,673,769 B2 | 3/2010 | McRorie, III | |
| 7,789,238 B2 | 9/2010 | Claypool et al. | |
| 2009/0066103 A1* | 3/2009 | Koarai | B60R 7/04 296/24.34 |

* cited by examiner

Primary Examiner — Dennis H Pedder
(74) Attorney, Agent, or Firm — Carlson, Gaskey & Olds, P.C.

(57) ABSTRACT

A door for a vehicle console includes first and second cover portions that each have an outer, exposed finished surface. The second cover portion is slidable between closed and open cover positions in which the second cover portion is substantially flush with the first cover portion in the closed cover position and is at least partially lapping the first cover portion in the open cover position. A bi-directional latch is actuatable in first and second opposed directions. Actuation in the first direction locks together the first and second cover portions in either closed or open positions and unlocks the door such that the first and second cover portions are rotatable in unison. Actuation in a second direction releases the first and second cover portions from one another such that the second cover portion is slidable from the closed cover position to the open cover position.

17 Claims, 7 Drawing Sheets

DOOR FOR VEHICLE CONSOLE

CROSS REFERENCE TO RELATED APPLICATION

This application claims priority to U.S. Provisional Patent Application No. 62/001,733 filed on May 22, 2014.

BACKGROUND

This disclosure relates to a door of a vehicle console. For example, many vehicles have a console storage compartment between the driver and passenger seats and/or next to rear passenger seats. Such storage compartments may have a door and a latch mechanism that serves to lock the door in a closed position. The latch mechanism can have a button or other actuator that, when pressed or actuated, opens the latch mechanism such that the door can be pivoted to an open position in which an interior storage area is accessible.

SUMMARY

A door for a vehicle console according to an example of the present disclosure includes first and second cover portions that each have an outer, exposed finished surface. The second cover portion is slidable between closed and open cover positions in which the second cover portion is substantially flush with the first cover portion in the closed cover position and is at least partially lapping the first cover portion in the open cover position. A bi-directional latch is actuatable in first and second opposed directions in which, actuation in the first direction locks together the first and second cover portions and unlocks the door such that the first and second cover portions are rotatable in unison, and actuation in the second direction releases the first and second cover portions from one another such that the second cover portion is slidable from the closed cover position to the open cover position.

A further embodiment of any of the foregoing embodiments includes a support structure supporting the first and second cover portions, and the support structure has opposed side walls and support cam slots in the side walls.

In a further embodiment of any of the foregoing embodiments, the second cover portion includes a plurality of retractable/extendable link pins that are slidable in the support cam slots.

A further embodiment of any of the foregoing embodiments includes a door latch rod that is moveable along one of the opposed side walls, and the link pins are extendable through the support cam slots into lock holes in the door latch rod.

In a further embodiment of any of the foregoing embodiments, extension of the link pins through the support cam slots into the lock holes retracts the door latch rod and unlocks the door such that the first and second cover portions are rotatable in unison.

A further embodiment of any of the foregoing embodiments includes a bias member biasing the door latch rod toward an extended, locked position.

A further embodiment of any of the foregoing embodiments includes a latch plate that has plate cam slots, and the link pins are also slidable in the plate cam slots.

In a further embodiment of any of the foregoing embodiments, the bi-directional latch includes a bi-directional paddle that is moveable in first and second opposed directions in which movement in the first direction extends the latch plate and retracts the link pins and movement in the second direction retracts the latch plate and extends the link pins.

A vehicle console according to an example of the present disclosure includes a compartment that has an interior storage area, and a door that is rotatable between open and closed door positions with respect to the interior storage area. The door includes a first and second cover portions, and a bi-directional latch that is actuatable in first and second opposed directions in which actuation in the first direction unlocks the door and locks together the first and second cover portions such that the first and second cover portions are rotatable in unison from the closed door position to the open door position, and actuation in the second direction releases the first and second cover portions from one another such that the second cover portion is slidable from a closed cover position substantially flush with the first cover portion to an open cover position at least partially lapping the first cover portion.

In a further embodiment of any of the foregoing embodiments, each of the first cover portion and the second cover portion has an outer, exposed finished surface.

In a further embodiment of any of the foregoing embodiments, the bi-directional latch includes latch plate with plate cam slots, extendable/retractable links pins that are slidable in the plate cam slots, and a bi-directional paddle that is moveable in the first and second opposed directions.

In a further embodiment of any of the foregoing embodiments, each movement of the bi-directional paddle in the first direction extends the latch plate and retracts the link pins and movement in the second direction retracts the latch plate and extends the link pins.

In a further embodiment of any of the foregoing embodiments, the door includes a support structure that has opposed side walls and support cam slots in the side walls, and the link pins are also slidable in the support cam slots.

In a further embodiment of any of the foregoing embodiments, the door includes a door latch rod that is moveable along one of the opposed side walls, and the link pins are extendable through the support cam slots into lock holes in the door latch rod.

In a further embodiment of any of the foregoing embodiments, extension of the link pins through the support cam slots into the lock holes retracts the door latch rod and unlocks the door such that the door is moveable from the closed door position to the open door position.

In a further embodiment of any of the foregoing embodiments, the door includes a bias member biasing the door latch rod toward a locked position in which the door cannot be rotated.

A vehicle console according to an example of the present disclosure includes a compartment that has an interior storage area, and a door that is rotatable between open and closed door positions with respect to the interior storage area. The door includes a first cover portion that extends across the compartment, and a second cover portion that is slidable between closed and open cover positions in which the second cover portion is substantially flush with the first cover portion in the closed cover position and is at least partially lapping the first cover portion in the open cover position.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
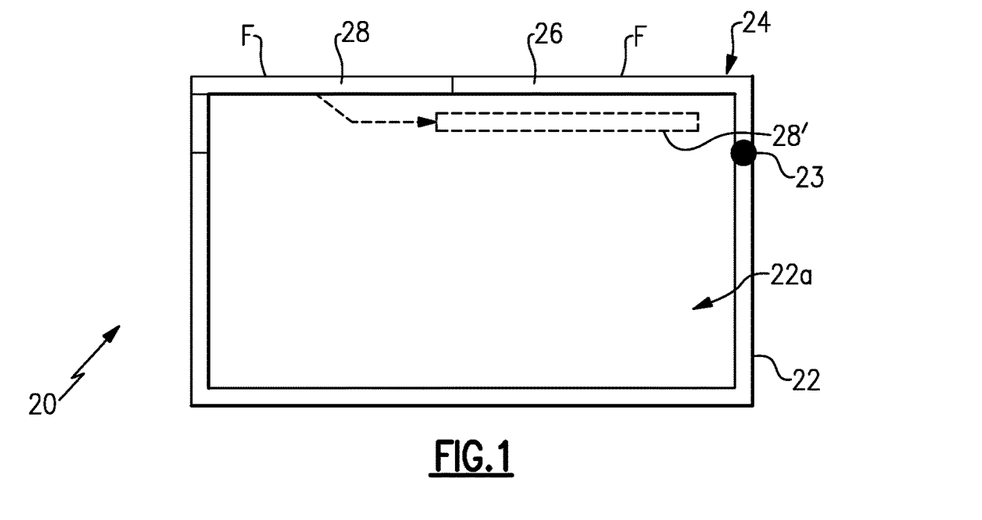
FIG. 1 illustrates an example vehicle console storage compartment.

FIG. 1 schematically illustrates an example vehicle console 20. As will be appreciated, the vehicle console 20 can be situated in a vehicle between the driver and the passenger seats, although the vehicle console 20 could alternatively be located elsewhere in a vehicle, such as but not limited to, next to a rear passenger seat. The vehicle console 20 serves both as a storage compartment and as an armrest for the driver and/or passenger of the vehicle.

The vehicle console 20 includes a compartment 22 that has an interior storage area 22a. In this example, a door 24 of the console 20 is mounted vertically above the compartment 22 and is rotatable about a pivot 23 between open and closed door positions with respect to the interior storage area 22a. In the open door position the door 24 the top of the storage area 22a is uncovered such that the storage area 22a can be accessed. In the closed door position the top of the storage area 22a is covered such that the storage area 22a cannot be accessed, at least through the top.

The door 24 provides dual accessibility to the storage area 22a such that the storage area 22a can be accessed either by rotating the door 24 upwards or by sliding a cover portion of the door 24 rearwards. In this regard, the door 24 includes first and second cover portions 26/28 that each have an outer, exposed finished surface, represented at F. The exposed finished surface F is the outermost surface of the door 24, which in this example is also the top surface of the door 24. The surface F is also a finished surface with regard to decorative aesthetics or other finishes typically employed in vehicle interiors. The outer, finished surface F serves as an armrest for the driver and/or passenger.

As shown in phantom in FIG. 1, the second cover portion 28 of the door 24 is slidable, as represented at 28', between closed and open cover positions. In the closed cover position, the second cover portion 28 is substantially flush with the first cover portion 26 such that the interior storage area 22a is fully covered and inaccessible. The term "substantially flush" refers to the finished surfaces F of the cover portions 26/28 being about even such that together the finished surfaces F form an even profile. The finished surfaces F may be slightly offset within typical manufacturing tolerances, assembly tolerances, or the like.

In the open cover position the second cover portion 28 at least partially laps the first cover portion 26 such that the interior storage area 22a is uncovered and accessible. The term "lap" or variations thereof refers to the second cover portion 28 at least partially overlapping or underlapping the first cover portion 26 with respect to the interior storage area 22a. In the illustrated example, the second cover portion 28 underlaps the first cover portion 26 when in the open cover position, which permits much of a latch/actuation mechanism for operating the door 24 to be hidden from view in the door 24.

Figure 2:
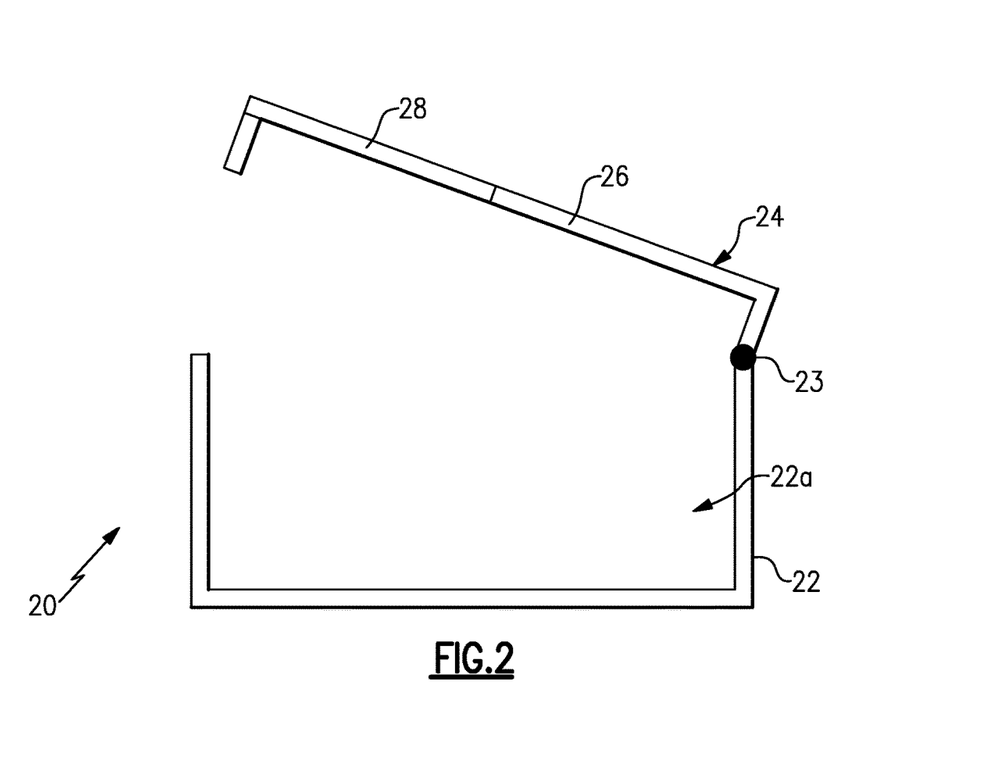
FIG. 2 illustrates the console of FIG. 1 with a door in an open door position.

As shown in FIG. 2, the first and second cover portions 26/28 can also be locked together such that they are rotatable in unison to rotate the door 24 from the closed door position shown in FIG. 1 to an open door position shown in FIG. 2. Thus, the door provides dual accessibility in that the door 24 can be rotated open/closed and the second cover portion 28 can be slid open/closed, for rapid and easy access to the interior storage area 22a.

Figure 3:
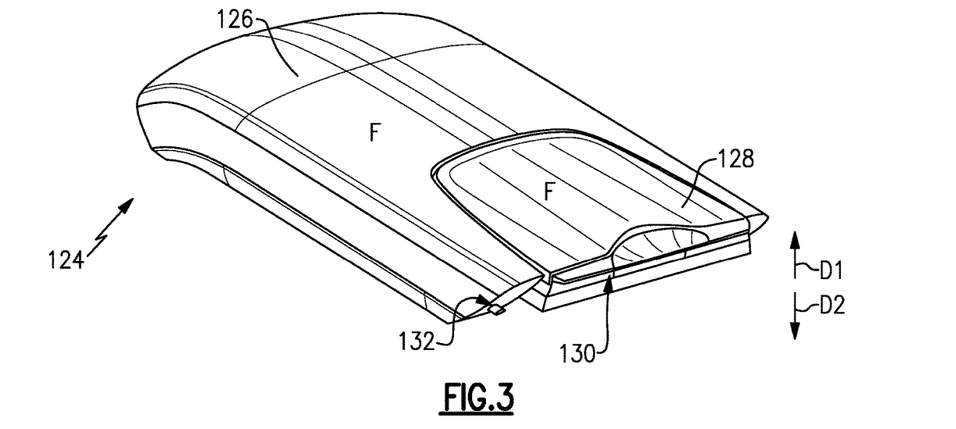
FIG. 3 illustrates another example door for a vehicle console, with the door in a home, locked position.
Figure 4:
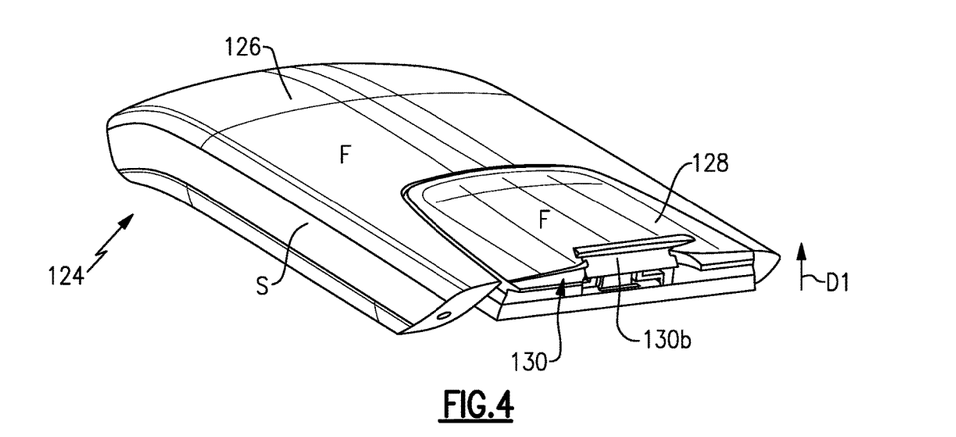
FIG. 4 illustrates the door of FIG. 3 in a first actuated position where the door is unlocked and a cover of the door is in a closed cover position.
Figure 5:
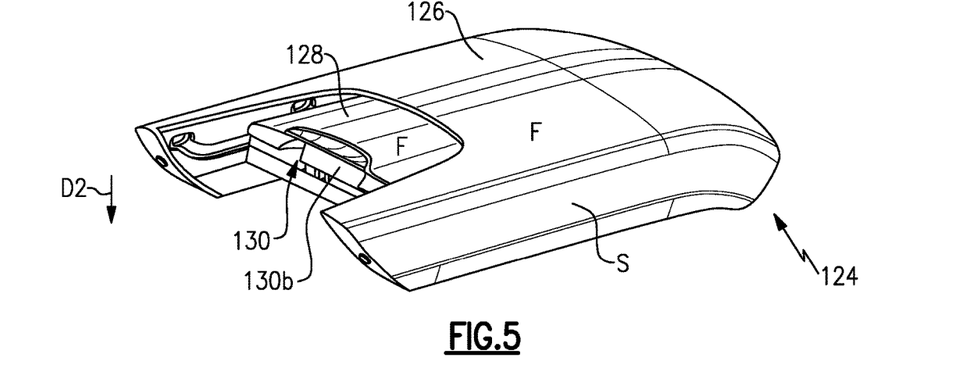
FIG. 5 illustrates the door of FIG. 3 in a second actuated position where the door is locked and a cover of the door is in an open cover position.

FIGS. 3, 4, and 5 illustrate design views of another example door 124. In this disclosure, like reference numerals designate like elements where appropriate and reference numerals with the addition of one-hundred or multiples there of designate modified elements that are understood to incorporate the same features and benefits of the corresponding elements. In this example, the door 124 includes first and second cover portions 126/128 and a bi-directional latch 130 is actuatable in first and second opposed directions, generally at represented at D1 and D2. The directions D1 and D2 can be opposed linear vertical directions or opposed arced directions, for example. The bi-directional latch 130 can include, for example, a paddle or handle for actuation and an internal latch mechanism, which is described in further detail below.

As shown in FIG. 3, the paddle portion of the bi-directional latch 130 is in a home, or non-actuated, neutral position in which the second cover portion 128 is in its closed cover position and is substantially flush with the first cover portion 126. In the home position, the door 124 is in a non-rotated, closed door position with regard to the compartment 22. In the closed door position, a door latch rod 132 is extended forward and engages a mating lock feature (not shown) in the compartment 22, to lock the door 124 in the closed door position. In this regard, the door latch rod 132 includes a bias member 132a (FIG. 6A), such as a spring, that biases the door latch rod 132 toward an extended, locked position.

FIG. 4 shows the door 124 with at least the paddle portion of the bi-directional latch 130 actuated in the D1 direction. As will be described in further detail below, actuation in the D1 direction serves to retract the door latch rod 132 through the internal latch mechanism such that the door 124 can be rotated with respect to the compartment 22 to the open door position. In this regard, the first and second cover portions 126/128 rotate in unison from the closed door position to the open door position.

Alternatively, if the paddle of the bi-directional door latch 130 is actuated in direction D2, the second cover portion 128 can be slid downward and rearward, as shown in FIG. 5, in this example such that the second cover portion 128 moves to its open cover position at least partially underlapping the first cover portion 126. In other words, the second cover portion 128 slides underneath the first cover portion 126.

Figure 6A:
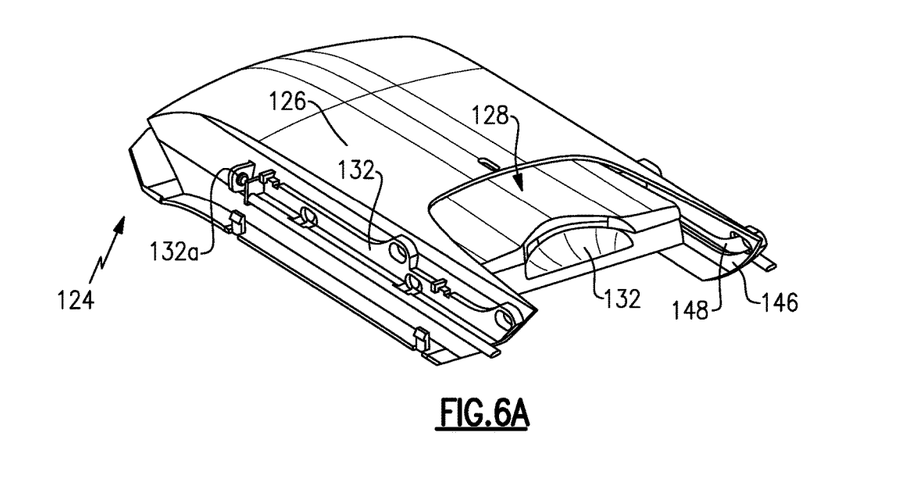
FIGS. 6A, 6B, 6C, and 6D illustrate views of a bi-directional door latch of the door as shown in FIG. 5.
Figure 6B:
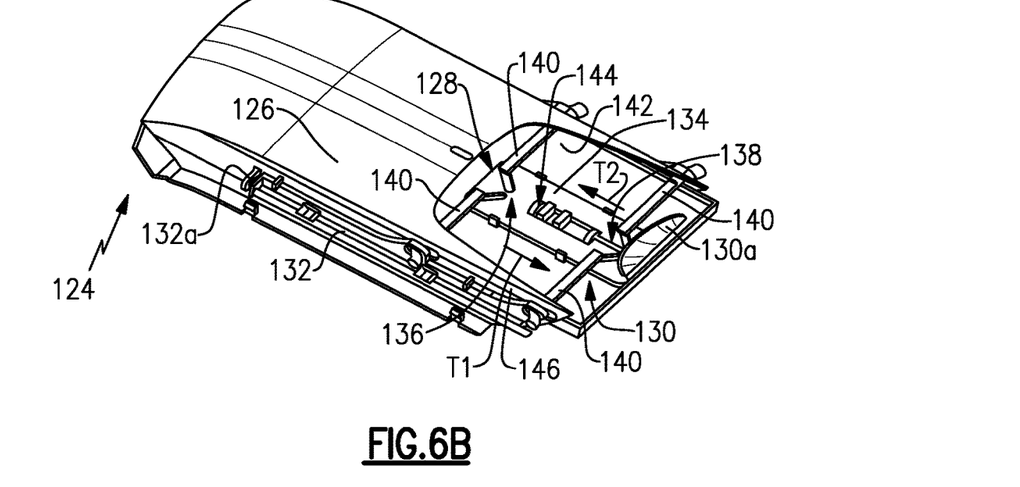
Figure 6C:
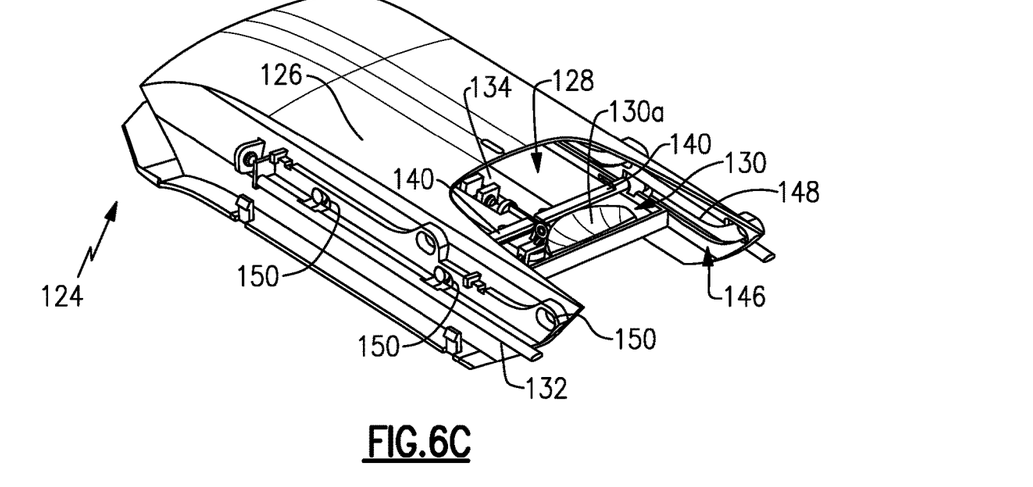

FIGS. 6A, 6B, 6C, and 6D show the door 124 with the second cover portion 128 slid to its fully open cover position. In the views shown, portions of the door 124 have been excluded or made transparent in order to show the hidden mechanisms of the door 124. In particular, at least portions of the side edges (designated "S" in FIGS. 4 and 5) of the door 124 have been excluded or made transparent, although the edges S are part of the first cover portion 126. In this example, the bi-directional latch 130 is contained mainly within the second cover portion 128. FIG. 6B shows the bi-directional latch 130, which includes a bi-directional paddle 130a that can be actuated in either the D1 or D2 directions. The bi-directional paddle 130a is engaged with a latch plate 134 via a tab 130 b such that rotational movement of the bi-directional paddle 130a moves the tab 130 b and thus the latch plate 134 horizontally. For example, movement of the bi-directional paddle 130a in the D1 direction moves the latch plate 134 in a forward or T1 direction from a neutral position. Movement of the bi-directional paddle 130a in the D2 direction moves the latch plate 134 in a rearward or T2 direction from the neutral position.

Figure 6D:
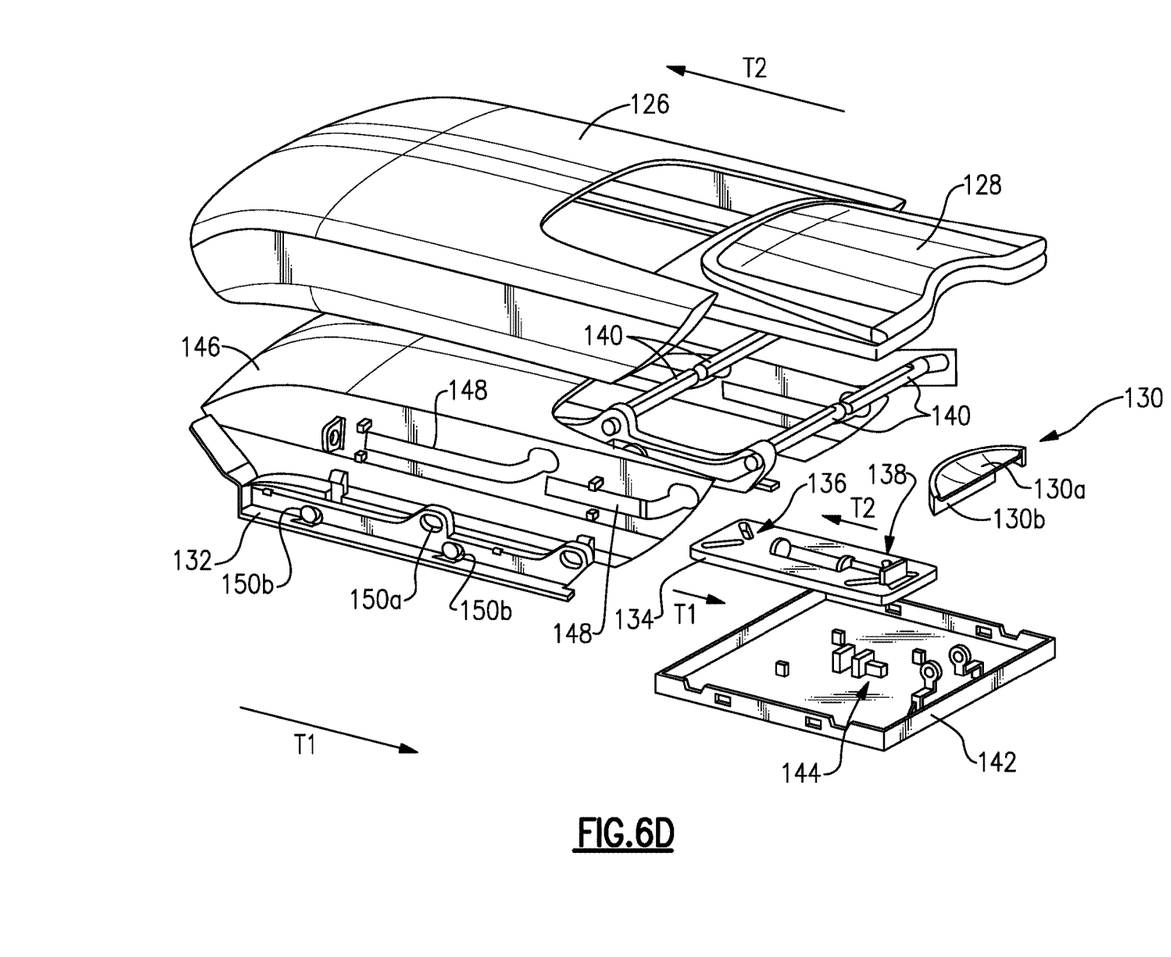

The latch plate 134 includes two sets of cam plate slots 136/138, best shown in FIG. 6D. Each set of cam plate slots 136/138 includes two cam slots that generally form a "V" shape and are sloped with respect to the T1 and T2 directions. Each cam slot 136/138 receives an inboard end of a link pin 140. The latch plate 134 is mounted on a latch plate housing 142, which includes a bias member, such as a spring 144, to a bias the bi-directional latch 130 to its neutral position in which the inboard ends of the link pins 140 are located approximately in the middle of the respective cam slots 136/138.

The door 124 also includes a support structure 146 that supports the second cover portion 128 by way of support cam slots 148 (FIG. 6A, 6D). The respective opposed outboard ends of the link pins 140 are received into the support cam slots 148. In this regard, the support structure 146 includes one support cam slot 148 on each opposed side that receives two of the link pins 140 (i.e., a forward link pin and a rear link pin, best shown in FIG. 6D). Thus, upon actuation of the bi-directional paddle 130a in the D2 direction, the link pins 140 are retracted slightly inwardly into the second cover portion 128 and can ride along the cam slots 148 such that the second cover portion 128 can be slid rearward and downwardly to underlap the first cover portion 126. Upon reaching a full rearward position, the link pins 140 extend outwardly through the support cam slots 148 into locking holes, generally represented at 150, in the door latch rod 132. The locking holes 150 include a set of forward locking holes 150a used in the closed position and a rear set of locking holes 150b used in the open position, best shown in FIG. 6D. Another actuation of the bi-directional paddle 130a in the same D2 direction serves to retract the link pins 140 from the locking holes 150 such that the link pins 140 can again slide in the support cam slots 148 forward and upward to the closed cover position.

Figure 7A:
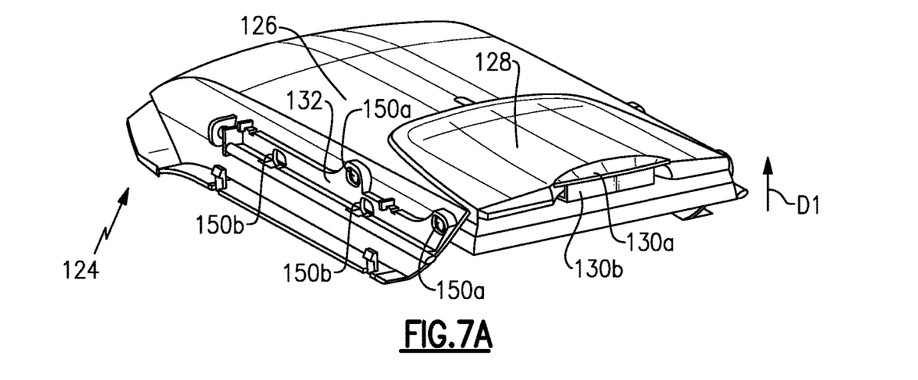
FIGS. 7A, 7B, and 7C illustrate views of the bi-directional door latch of the door as in FIG. 4.
Figure 7B:
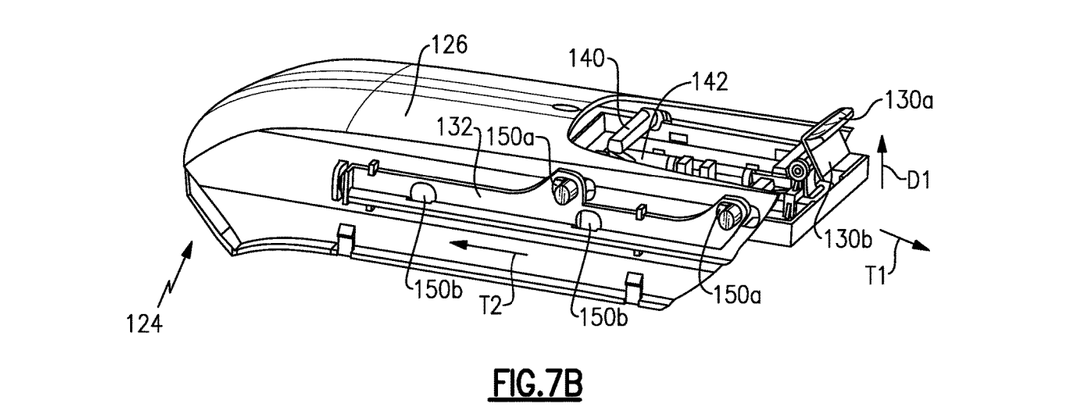
Figure 7C:
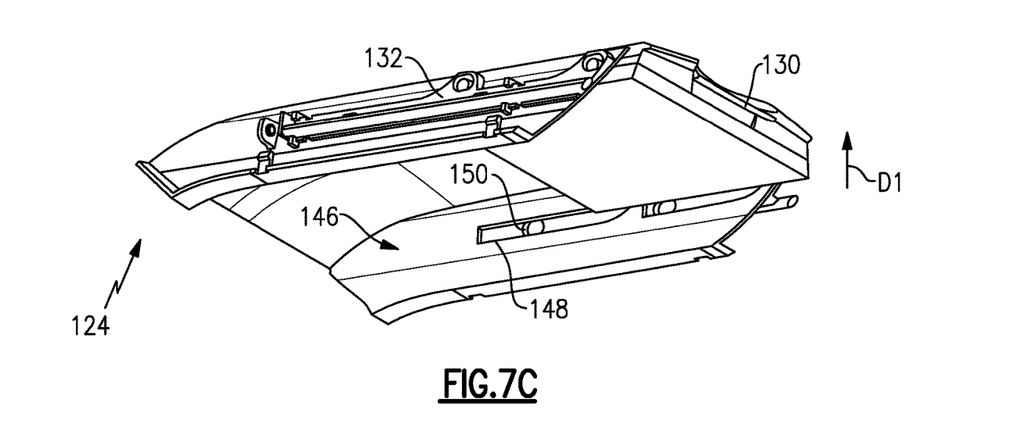
Figure 8A:
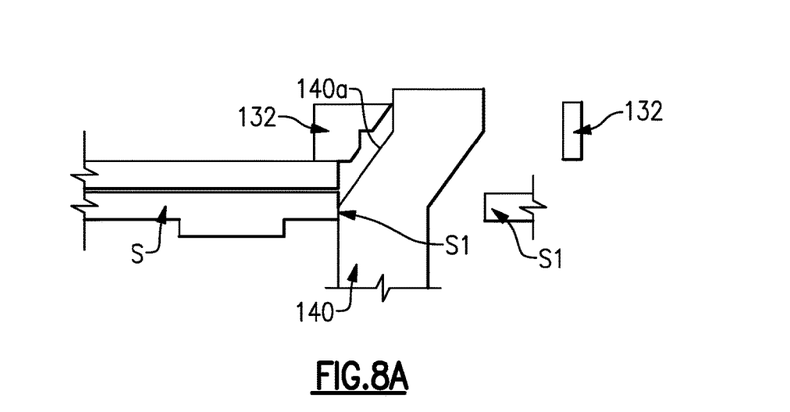
FIGS. 8A and 8B illustrate an example link pin retracting a door latch rod.
Figure 8B:
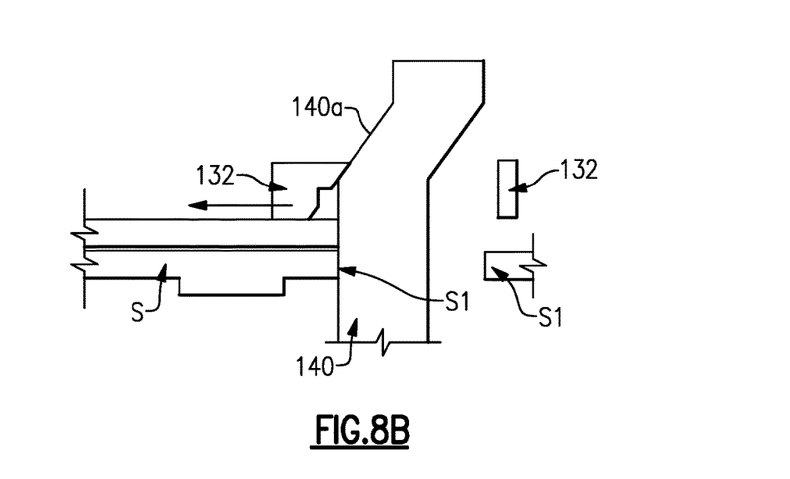

FIGS. 7A, 7B, and 7C show the door 124 with the bi-directional paddle 130a actuated in the D1 direction. Upon actuation of the bi-directional paddle 130a in the D1 direction, the latch plate 134 moves forward in the T1 direction such that each of the link pins 140 extends outwardly from the second cover portion 128 through the respective support cam slots 148 and through one of the locking holes 150 of the door latch rod 132. As an example, one or more ends of the link pins 140 are sloped, as shown at 140a in FIG. 8A, and at least partially laterally offset from the locking holes 150 such that movement of the link pin or pins 140 further through the locking holes 150 causes the sloped end 140a of the link pin 140 to contact the side of the locking hole 150 and push the door latch rod 132 rearward in the T2 direction to retract the door latch rod 132, as shown in FIG. 8B. The sloped end or surface is thus a bearing surface with respect to the side of the hole 150. The door latch rod 132 retracts with respect to the support structure 146 and thus unlocks the door 124.

Additionally, the extension of the link pins 140 through the support cam slots 148 into the locking holes 150a locks the first and second cover portions 126/128 together such that, upon upward rotation of the door 124, the first and second cover portions 126/128 rotate in unison. In this regard, the tip ends of the link pins 140 are received in internal openings S1 in the sides S of the first cover portion 126, to lock the first and second cover portions 126/128 together. Thus, actuation of the bi-directional paddle 130a in the D2 direction serves to slide the second cover portion 128 to the open cover position, while actuation of the bi-directional paddle 130a in the D1 direction serves to lock the first and second cover portions 126/128 together and also unlock the door 124 such that it can be rotated from its closed door position to its open door position. In other words, a single paddle can be used to either rotate the door 124 or slide the second cover portion 128. This function is equally available in both closed, i.e. forward, position of cover 128, and in its open, i.e. retracted, underlapped, position.

The bi-directional paddle 130a therefore has three functional positions, including the neutral or home position, a position actuated in the D2 direction (to move the second cover portion 128 to an open position), and a position actuated in the D1 direction (to rotate the door 124 to an open door position). The relative positions of the inboard and outboards ends of the link pins 140 for each functional position are summarized in the Table below.

TABLE

Relative Positions of Link Pins

| Paddle Position | Link Pin Inboard End Position | Link Pin Outboard End Position | |
|---|---|---|---|
| Neutral/Home | middle of cam slots 136/138 | Through Hole 150 of Door Latch Rod 132 | Yes |
| | | In hole S1 of Side S | Yes |
| | | Sloped Surface 140a Engaged With Hole 150 | No |
| Actuated D1 (up, to open door 124) | rearward end of cam slots 136/138 | Through Hole 150 of Door Latch Rod 132 | Yes |
| | | In hole S1 of Side S | Yes |
| | | Sloped Surface 140a Engaged With Hole 150 | Yes |
| Actuated D2 (down, to slide second cover portion 128) | forward end of cam slots 136/138 | Through Hole 150 of Door Latch Rod 132 | No |
| | | In hole S1 of Side S | No |
| | | Sloped Surface 140a Engaged With Hole 150 | No |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A door for a vehicle console, comprising:
   first and second cover portions that each have an outer, exposed finished surface, the second cover portion is slidable between closed and open cover positions in which the second cover portion is substantially flush with the first cover portion in the closed cover position and is at least partially lapping the first cover portion in the open cover position; and
   a bi-directional latch that is actuatable in first and second opposed directions in which,
      actuation in the first direction locks together the first and second cover portions and unlocks the door such that the first and second cover portions are rotatable in unison, and
      actuation in the second direction releases the first and second cover portions from one another such that the second cover portion is slidable from the closed cover position to the open cover position.

2. The door as recited in claim 1, including a support structure supporting the first and second cover portions, and the support structure has opposed side walls and support cam slots in the side walls.

3. The door as recited in claim 2, wherein the second cover portion includes a plurality of retractable/extendable link pins that are slidable in the support cam slots.

4. The door as recited in claim 3, including a door latch rod that is moveable along one of the opposed side walls, and the link pins are extendable through the support cam slots into lock holes in the door latch rod.

5. The door as recited in claim 4, wherein extension of the link pins through the support cam slots into the lock holes retracts the door latch rod and unlocks the door such that the first and second cover portions are rotatable in unison.

6. The door as recited in claim 5, including a bias member biasing the door latch rod toward an extended, locked position.

7. The door as recited in claim 4, including a latch plate that has plate cam slots, and the link pins are also slidable in the plate cam slots.

8. The door as recited in claim 7, wherein the bi-directional latch includes a bi-directional paddle that is moveable in first and second opposed directions in which movement in the second direction extends the latch plate and retracts the link pins and movement in the first direction retracts the latch plate and extends the link pins.

9. A vehicle console comprising:
   a compartment that has an interior storage area; and
   a door that is rotatable between open and closed door positions with respect to the interior storage area, the door including:
   first and second cover portions, and
   a bi-directional latch that is actuatable in first and second opposed directions in which,
      actuation in the first direction unlocks the door and locks together the first and second cover portions such that the first and second cover portions are rotatable in unison from the closed door position to the open door position, and
      actuation in the second direction releases the first and second cover portions from one another such that the second cover portion is slidable from a closed cover position substantially flush with the first cover portion to an open cover position at least partially lapping the first cover portion.

10. The vehicle console as recited in claim 9, wherein each of the first cover portion and the second cover portion has an outer, exposed finished surface.

11. The vehicle console as recited in claim 9, wherein the bi-directional latch includes latch plate with plate cam slots, extendable/retractable links pins that are slidable in the plate cam slots, and a bi-directional paddle that is moveable in the first and second opposed directions.

12. The vehicle console as recited in claim 11, wherein movement of the bi-directional paddle in the second direction extends the latch plate and retracts the link pins and movement in the first direction retracts the latch plate and extends the link pins.

13. The vehicle console as recited in claim 12, wherein the door includes a support structure that has opposed side walls and support cam slots in the side walls, and the link pins are also slidable in the support cam slots.

14. The vehicle console as recited in claim 13, wherein the door includes a door latch rod that is moveable along one of the opposed side walls, and the link pins are extendable through the support cam slots into lock holes in the door latch rod.

15. The vehicle console as recited in claim 14, wherein extension of the link pins through the support cam slots into the lock holes retracts the door latch rod and unlocks the door such that the door is moveable from the closed door position to the open door position.

16. The vehicle console as recited in claim 15, wherein the door includes a bias member biasing the door latch rod toward a locked position in which the door cannot be rotated.

17. A vehicle console comprising:
   a compartment that has an interior storage area; and
   a door that is rotatable between open and closed door positions with respect to the interior storage area, the door including:
   a first cover portion that extends across the compartment, and
   a second cover portion that is slidable between closed and open cover positions in which the second cover portion is substantially flush with the first cover portion in the closed cover position and is at least partially lapping the first cover portion in the open cover position, and wherein the second cover portion is rotatable with the first cover portion in both the first and open cover positions.

* * * * *